(12) United States Patent
Djukastein et al.

(10) Patent No.: US 6,283,064 B1
(45) Date of Patent: Sep. 4, 2001

(54) PEST REPELLING DEVICE

(75) Inventors: Erik Djukastein, Sidney (CA); Roger Snow, Bellvedere, CA (US)

(73) Assignee: Contech Electronics, Inc., Saanichton (CA)

( * ) Notice: Subject to any disclaimer, the term of this patent is extended or adjusted under 35 U.S.C. 154(b) by 0 days.

(21) Appl. No.: 09/475,427

(22) Filed: Dec. 30, 1999

(51) Int. Cl.$^7$ .................................................. A01K 37/00
(52) U.S. Cl. ............................ 119/713; 52/101; 43/112
(58) Field of Search ............................ 119/328, 467, 119/468, 531, 532, 57.8, 57.9, 52.2, 52.3, 713; 52/101; 43/1, 112; 361/232

(56) References Cited

U.S. PATENT DOCUMENTS

| | | |
|---|---|---|
| 2,626,303 | 1/1953 | Link . |
| 3,294,893 * | 12/1966 | Shaffer .................................. 119/532 |
| 3,366,854 | 1/1968 | Robinson . |
| 3,717,802 | 2/1973 | Plevy et al. . |
| 4,262,169 * | 4/1981 | Lanton, Jr. ........................... 119/532 |
| 4,299,048 | 11/1981 | Bayes . |
| 4,355,201 | 10/1982 | Wilson, Sr. . |
| 4,706,941 | 11/1987 | Sherdan . |
| 5,096,162 | 3/1992 | Cleveland . |
| 5,163,658 | 11/1992 | Cleveland . |
| 5,850,808 | 12/1998 | Burdick . |
| 6,006,698 * | 12/1999 | Negre ..................................... 119/537 |

FOREIGN PATENT DOCUMENTS

| | | |
|---|---|---|
| 2049509 | 8/1991 | (CA) . |

* cited by examiner

Primary Examiner—Thomas Price
(74) Attorney, Agent, or Firm—Francis C. Hand; Carella, Byrne, Bain et al

(57) ABSTRACT

In accordance with the present invention there is provided an elongated deterrent strip for mounting to an inanimate object to discourage birds and other pests from resting on that object. The strip comprises a base of electrically non-conductive material. The strip in lateral cross-section has peripheral edges normally lying in a plane and a raised concave center portion. The base has spaced notches along each edge to provide flexibility to the base, whereby the base may be bent both out of the plane and within the plane. The strip further comprises two electrically conductive wires secured to and extending along the upper surface of the base, over the notches. The wires are spaced so that pest's feet will contact both wires when perched on the base. The wires are connectable to an energy source so that the bird or other pest's feet will short the wires when it is perched on the strip, giving a mild shock to the pest to discourage it from continuing its perch on the strip. The wires are crimped in undulating fashion along their length, to provide them with give so that they will not disassociate from the base when it is bent or when the wires and base expand and contract at different rates.

8 Claims, 3 Drawing Sheets

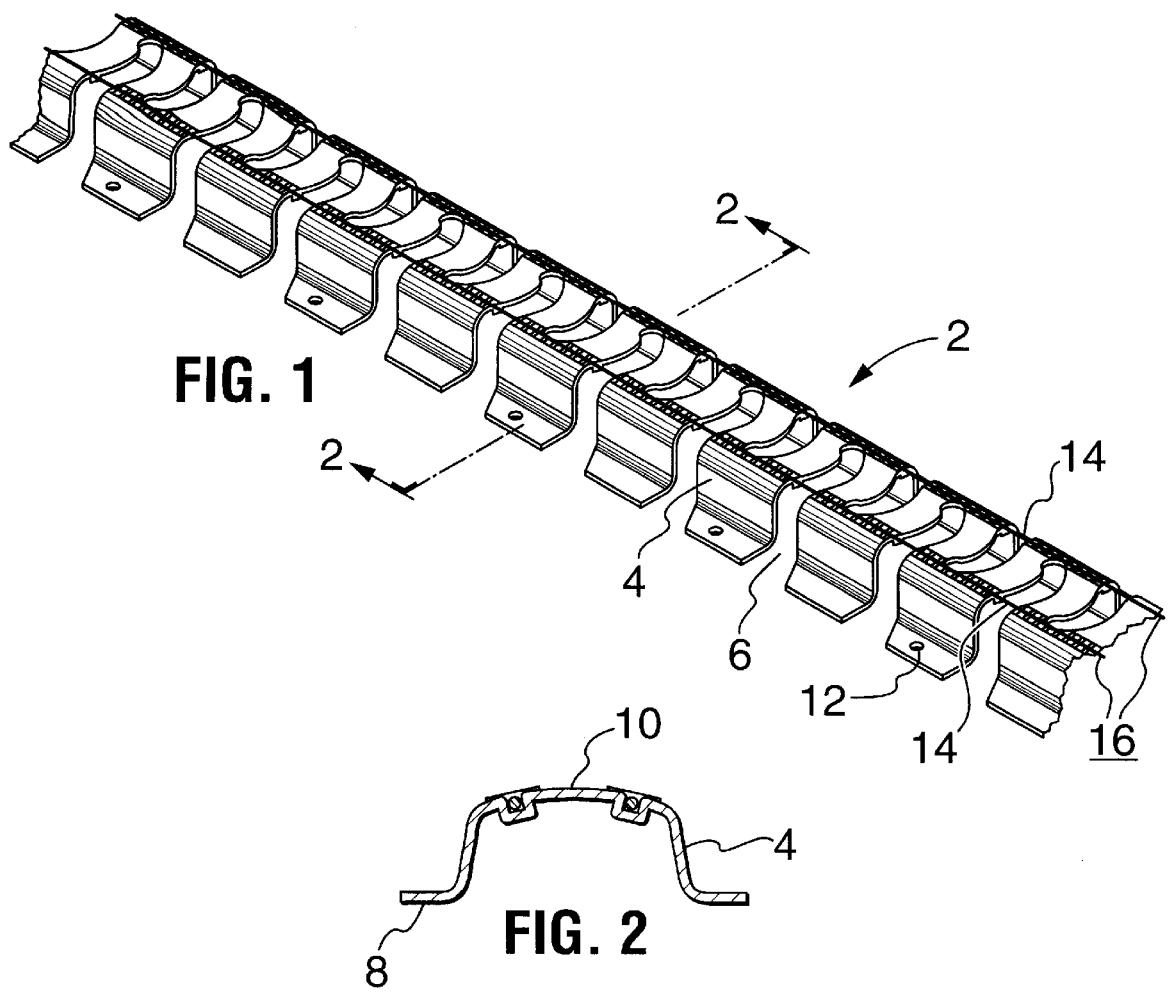
FIG. 1
FIG. 2
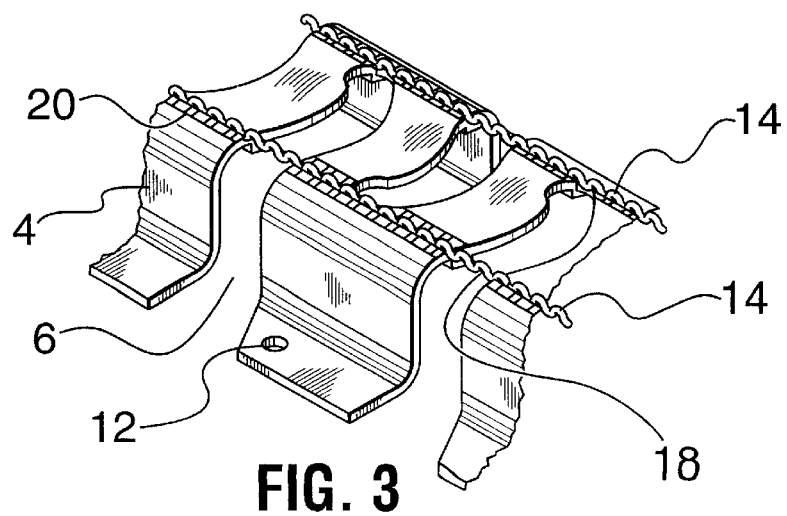
FIG. 3

PEST REPELLING DEVICE

BACKGROUND OF THE INVENTION

The present invention relates to a pest repelling device, and more particularly to a device which may be secured to a building, statue or the like to discourage birds and other pests from resting thereon.

Devices carrying electric charges for discouraging birds and other pests are known and described for example in Burdick, U.S. Pat. No. 5,850,808, issued Dec. 22, 1998, Morros, Canadian Patent Application Serial No. 2,049,509, filed Aug. 19, 1991, Shaffer, U.S. Pat. No. 3,294,893, issued Dec. 27, 1966, Plevy et al, U.S. Pat. No. 3,717,802, issued Feb. 20, 1973, Robinson, U.S. Pat. No. 3,366,854, issued Jan. 30, 1968 and Bayes, U.S. Pat. No. 4,299,048 issued Nov. 10, 1981. These devices generally provide a pair of spaced wires carrying an electrical charge, so that when the feet of a bird contact them, they short out and provide a shock to the bird. Such prior art devices 15 require one to make a choice between a relatively flexible cable, such as that of Shaffer, Bayes or Robinson, which can be bent in a variety of shapes to follow the contour of a support service, and the relative rigidity of a device such as that of Plevy et al, which must be preformed to the shape of the structure on which it is to sit, providing a better base for support on another surface. As well, with such prior art systems, because the base on which the wires sit will expand and contract at a significantly different rate than the wires, when exposed to the normal outdoor conditions for which such devices are designed, there is a trade off between leaving the wires fully exposed, in which case they may work themselves loose from the base through repetitive heating and cooling cycles, and a fully secured arrangement where the wires are partially embedded in the base which may reduce the exposure of the wires and thereby impede the device's effectiveness.

Sherdan, U.S. Pat. No. 4,706,941, issued Nov. 17, 1987 and Cleveland, U.S. Pat. Nos. 5,163,658, and 5,096,162 issued Nov. 17, 1992 and Mar. 17, 1992, respectively describe and illustrate electric fence constructions and are of general background interest. Link, U.S. Pat. No. 2,626,303, issued Jan. 20, 1953, describes and illustrates a perforated support for electrical conductors to reduce the collection of moisture and the like.

It is accordingly an object of the present invention to provide a deterrent strip for mounting on inanimate objects to discourage birds or other pests from resting there, which strip will be more adaptable to a variety of conditions. It is a further object of this invention to provide such a strip which will provide better exposure of the wires while at the same time securely hold those wires in place on the base even during conditions of changing temperature, when the base and wire expansions and contractions occur at different rates.

SUMMARY OF THE INVENTION

In accordance with the present invention there is provided an elongated deterrent strip for mounting to an inanimate object to discourage birds and other pests from resting on that object. The strip comprises a base of electrically non-conductive material. The strip in lateral cross-section has peripheral edges normally lying in a plane and a raised concave center portion. The base has spaced notches along each edge to provide flexibility to the base, whereby the base may be bent both out of the plane and within the plane. The strip further comprises two electrically conductive wires secured to and extending along the upper surface of the base, over the notches. The wires are spaced so that animal's feet will contact both wires when on the base. The wires are connectable to an energy source so that the animal's feet will short the wires when perched on the strip, giving a mild shock to the animal to discourage them from continuing its perch on the strip. The wires are crimped in undulating fashion along their length, to provide them with give so that they will not disassociate from the base when it is bent or when the wires and base expand and contract at different rates.

In a preferred embodiment of the present invention, the wires are crimped in undulating fashion along the length of the base.

The wires are secured by clips formed in the base, the clips gripping and securing the wires preferably at low points on their undulations. As well, the notches each extend inwardly from an edge beyond the center of the concave portion below both wires. These features facilitate the bending of the deterrent strip both within its plane and outside of its plane, while at the same time holding the wires securely in place on the base during the varying temperature conditions to which the strip will be exposed during use.

BRIEF DESCRIPTION OF THE DRAWINGS

The following is a description by way of example of an example embodiment of the present invention, reference being made to the accompanying drawings in which:

FIG. 1 is a perspective view of a portion of a deterrent strip in accordance with the present invention.

FIG. 2 is a section view of the strip along the lines 2—2 of FIG. 1.

FIG. 3 is an enlarged perspective partial view of the strip of FIG. 1.

Figure 3A:
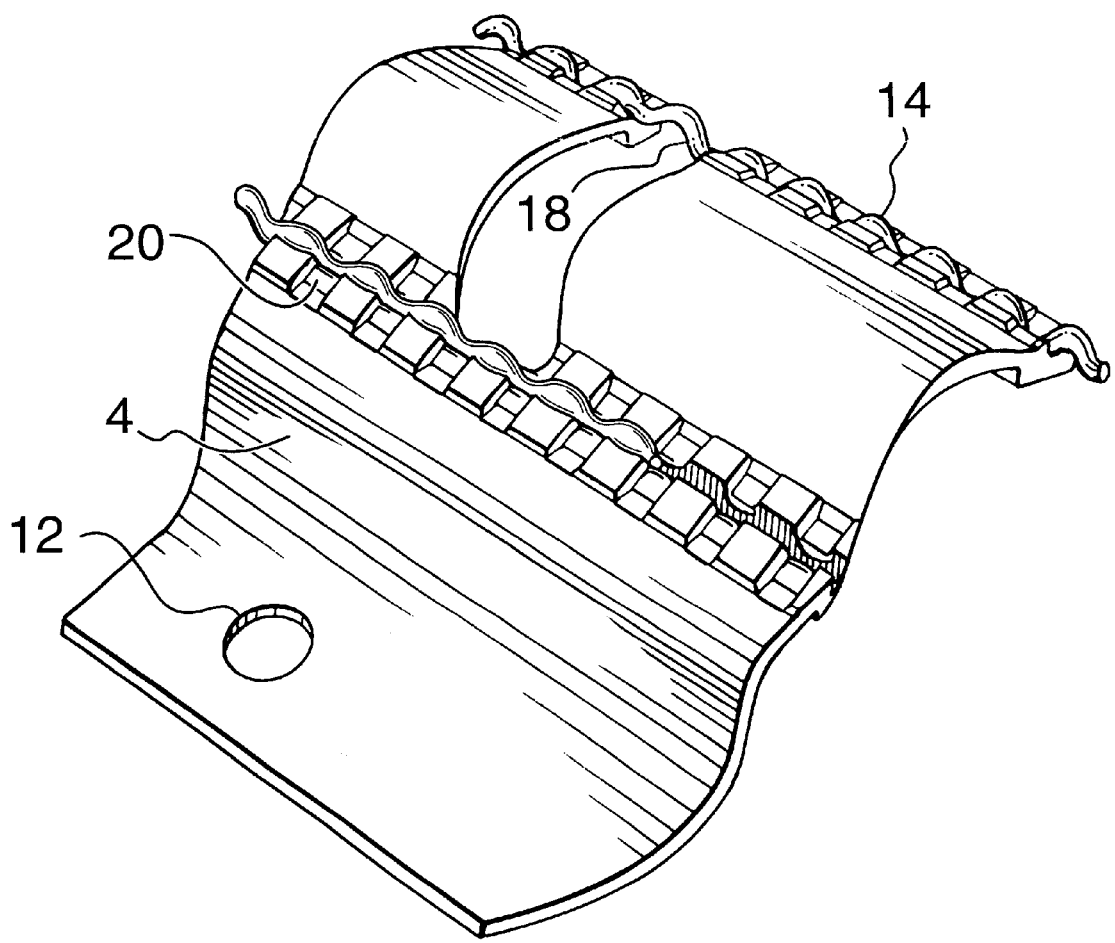
FIG. 3a is an enlarged perspective view of the clips used to secure the wires in the strip.

While the invention will be described in conjunction with the illustrated embodiment, it will be understood that it is not intended to limit the invention to such embodiment. On the contrary, it is intended to cover all alternatives, modifications, and equivalents as may be included within the spirit and scope of the invention as defined by the appended claims.

DETAILED DESCRIPTION OF THE PREFERRED EMBODIMENTS

In the drawings, similar features have been given similar reference numerals.

Figure 4:
FIGS. 4 and 5 are perspective view of strips in accordance with the present invention applied as pest deterrents in different environments, namely on a statue (FIG. 4) and on a building ledge (FIG. 5).
Figure 5:
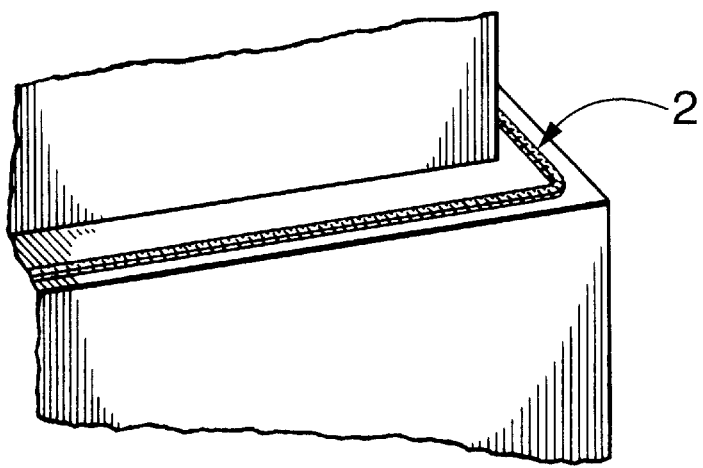

Turning to FIG. 1 there is shown an elongated deterrent strip 2, in accordance with the present invention, for mounting for example on inanimate objects such statues (Figure 4) or portions of buildings (FIG. 5) to discourage birds or other pests from resting on such objects. Strip 2 comprises a base 4 having spaced notches 6 along each edge to provide flexibility to the base, the base being made of an electrically non-conductive material such as plastic. As can be seen in FIGS. 1 and 2, in lateral cross section the base has flat, peripheral edges 8 normally lying in a plane and a raised, concave portion 10. Spaced notches 6 alternate along each edge 8 along the length of the base, the notches each being of a similar shape and inwardly extending to a point beyond the center of the base 4. The notches are each relatively wide and curved in similar fashion, as illustrated, to facilitate bending of the base within the plane, for example to form a 90 curve as illustrated in FIG. 5. These notches also permit bending of the base out of the plane as shown in FIG. 4. A plurality of apertures 12, to receive retaining means such as screws, may be spaced as illustrated, along the edges.

A pair of electrically conductive wires 14 are secured to and extend in spaced fashion along the upper surface of base 4 as illustrated, each notch extending below each wire. The wires extend in parallel fashion and are spaced so that animal's feet will contact both wires when perched on the strip. The wires are connected to an electrical energy source 16 such as a conventional electric fence controller to deliver a mild shock to the bird when the bird or animal is perched on the strip, its feet shorting the wires. In this manner the bird or animal is discouraged from continuing its perch on the strip. Normally a charge in the range of from 500 to 1000 volts A.C. will suffice.

Because the base, when made of plastic, will tend to expand and contract longitudinally a greater relative amount than the wires 14, and to prevent wires 14 from becoming dissociated from base 4 when bent either within or out of the plane, as can best be seen in FIG. 3, wires 14 are provided with crimps 18 along their lengths as illustrated, giving them more ability to lengthen and shorten, above and beyond normal expansion or contraction, to accept to the expansion or contraction required as a result of heating and cooling and/or bending of base 4. To prevent wires 14 from being dissociated from base 4, integral clips 20 are formed in base 4, clips 20 holding wires 14 at the bottoms of the undulations formed by the crimping of the wires.

Referring to FIG. 3a, wherein like reference characters indicate like parts as above, the wires 18 are secured to the strip 4 by a plurality of jaw-like clips 20 formed integrally with the strip 4 along its upper surface with the clips 20 positioned to grip and secure the wires 14 at low points on the undulations of the wires 14.

Thus, the strip 4 according to the present invention provides flexibility both within the plane of the strip, as can be seen in FIG. 5 or outside of that plane, for example for application to an upper surface of a statue, as can be seen in FIG. 4. Its shaping enables it to be securely held to any such surface. The notches 6 not only enhance the flexibility of the device, but also provide for water repellency since the wires 14 are held above the surface supporting the strip 2 where water might otherwise build up. The heavy perforation of strip 4 provided by these notches 6 stops water from pooling on the supporting surface.

Thus, it is apparent that there has been provided in accordance with the invention a pest repelling device that fully satisfies the objects, aims and advantages set forth above. While the invention has been described in conjunction with an illustrated embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

We claim:

1. An elongated deterrent strip for mounting to an inanimate object to discourage birds and other pests from resting on that object, the strip comprising a base of electrically non-conductive material, the base in lateral cross-section having peripheral edges normally lying in a plane and a raised concave center portion, the base having spaced notches along each edge to provide flexibility to the base whereby the base may be bent both out of the plane and within the plane, two electrically conductive wires secured to and extending along the upper surface of the base, over the notches, the wires spaced so that a bird's feet will contact both wires when the bird is perched on the base, the wires connectable to an energy source so that the pest's feet will short the wires when the pest is perched on the strip and giving a mild shock to the pest to discourage it from continuing its perch on the strip, the wires being crimped in undulating fashion along their length, to provide them with give so that they will not disassociate from the base when it is bent or when the wires and base expand or contract at a different rate.

2. A strip according to claim 1 wherein the wires are crinkled in undulating fashion along the length of the base.

3. A strip according to claim 2 wherein the wires are secured to the strip by a plurality of jaw like clips formed integrally with the strip along its upper surface, the clips positioned to grip and secure the wires at low points on the undulations of the wires.

4. A strip according to claim 1 wherein the wires are secured to the strip by a plurality of jaw like clips formed integrally with the strip along its upper surface.

5. A strip according to claim 1 wherein the notches each extend inwardly from an edge to beyond a central portion of the concave portion towards the other edge.

6. A strip according to claim 5 wherein the notches are spaced in alternating fashion, from edge to edge, along the length of the strip.

7. A strip according to claim 1 associated with a power source to generate a charge of from between 500 to 1000 volts A.C.

8. A strip according to claim 1 wherein the base is of plastic.

* * * * *

UNITED STATES PATENT AND TRADEMARK OFFICE
CERTIFICATE OF CORRECTION

PATENT NO.   : 6,283,064 B1  
DATED        : September 4, 2001  
INVENTOR(S)  : Erik Djukastein Page 1 of 1

It is certified that error appears in the above-identified patent and that said Letters Patent is hereby corrected as shown below:

<u>Column 1,</u>  
Line 19, "15" should be deleted.

Signed and Sealed this

Eighteenth Day of December, 2001

Attest:

Attesting Officer

JAMES E. ROGAN  
*Director of the United States Patent and Trademark Office*

UNITED STATES PATENT AND TRADEMARK OFFICE
CERTIFICATE OF CORRECTION

PATENT NO. : 6,283,064 B1
DATED : September 4, 2001
INVENTOR(S) : Erick Djukastein and Roger Snow It is certified that error appears in the above-identified patent and that said Letters Patent is hereby corrected as shown below:

Title page,
Item [73], Assignee should read :
-- [73] Assignee: Contech Electronics, Inc., Saanichton (CA) Hot Foot America L. P. Belvedere, California --

Signed and Sealed this

Seventh Day of May, 2002

Attest:

JAMES E. ROGAN
*Attesting Officer*    *Director of the United States Patent and Trademark Office*